Aug. 24, 1926.                                              1,597,551
R. STEWART
COMBINED ANIMAL TRAP AND FEEDING TROUGH
Filed July 18, 1922          3 Sheets-Sheet 1

Inventor:
Robert Stewart,
By Knight Bros.
attys.

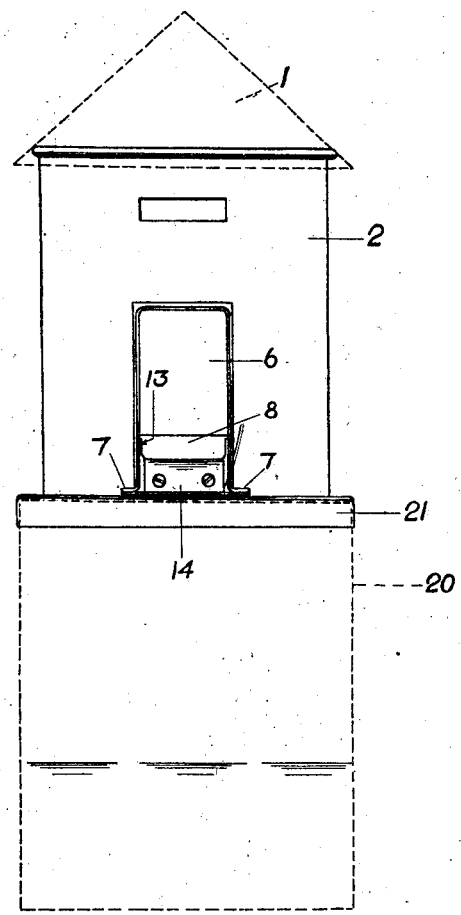

Aug. 24, 1926.
R. STEWART
1,597,551
COMBINED ANIMAL TRAP AND FEEDING TROUGH
Filed July 18, 1922    3 Sheets-Sheet 3
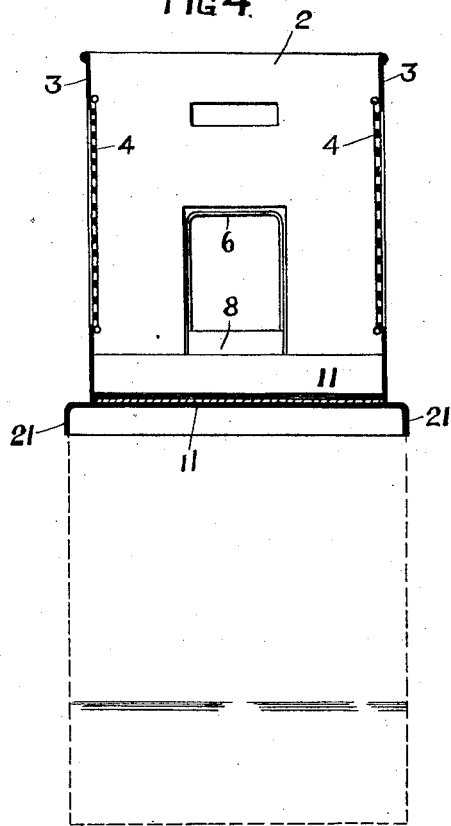
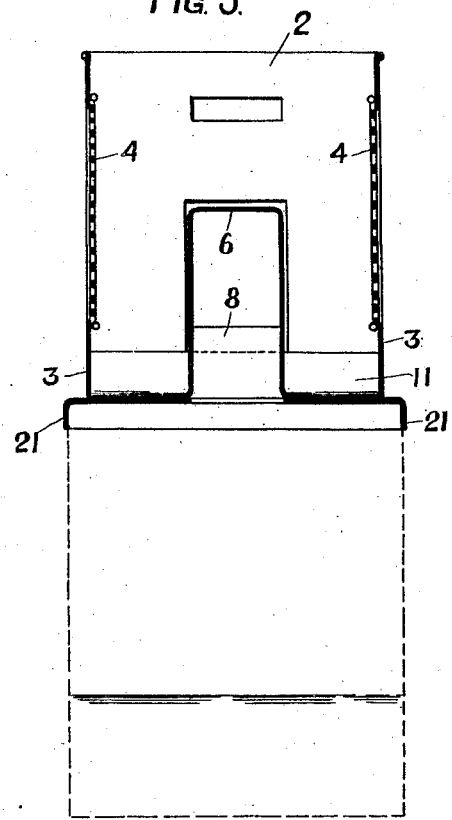
Inventor
Robert Stewart Patented Aug. 24, 1926.

1,597,551

UNITED STATES PATENT OFFICE.

ROBERT STEWART, OF EDINBURGH, SCOTLAND.

COMBINED ANIMAL TRAP AND FEEDING TROUGH.

Application filed July 18, 1922, Serial No. 575,858, and in Great Britain July 26, 1921.

Animal and poultry feeding troughs are a common source of the food supply of rats and the like, and this invention is designed to combine a trap with such feeding troughs so that rats and the like may be caught in the act of raiding the troughs and, by so disguising the trap, overcome the inherent trap-shyness of the rodents.

According to the present invention the animal trap comprises a floor or chute pivated intermediate its ends and normally held horizontal at one end in such a manner that the weight of the rodent upon the portion of the chute beyond the pivot effects sudden overbalancing of the chute.

The animal trap includes a tunnel open below at its inner end, the floor of the tunnel extending preferably from the outer end to about one third of its length, the chute being pivoted in said tunnel and being adapted, when overbalanced, to project downwardly through the open bottom of the tunnel.

The animal trap is combined with a food receptacle mounted above a container, the tunnel projecting into the food receptacle and being open below to the container so that the chute projects downwardly, when overbalanced, into said container. The food receptacle may have apertures in the sides thereof adapted to be closed, such as by means of portable or hinged wire netting guards.

Preferably the chute is normally sustained in horizontal position by a magnet carried by the tunnel and a keeper or armature on the end of the pivoted chute.

In order that the invention may be more clearly understood reference is hereinafter made to the accompanying drawings showing one construction of combined animal trap and food receptacle, by way of example.

Figure 1:
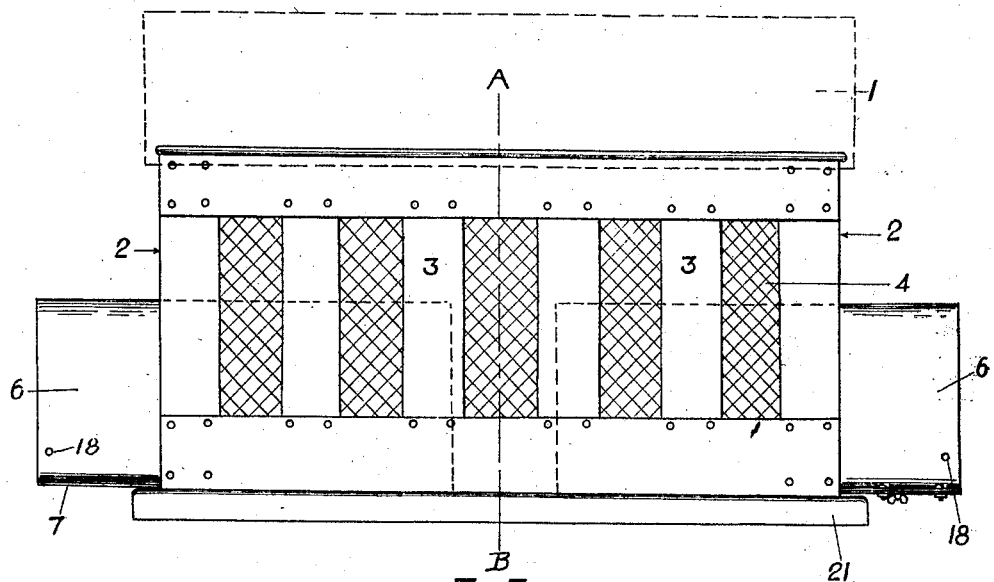
Figure 3:
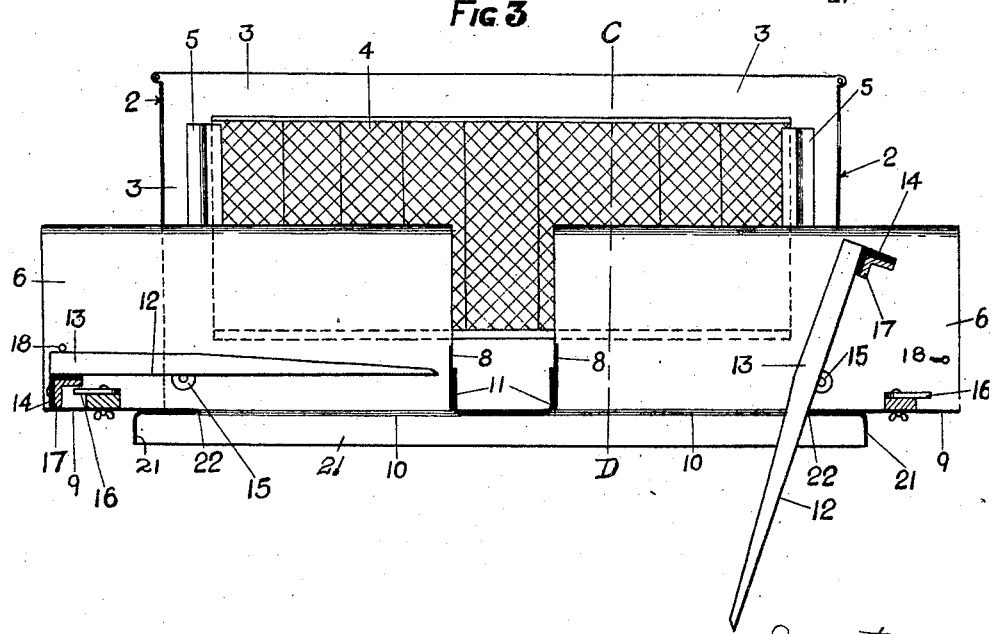

Figs. 1 and 2 are side and end views of the apparatus and Fig. 3 is a vertical longitudinal section mid-way through the apparatus. Fig. 4 is a section on line A—B of Fig. 1 and Fig. 5 is a section on line C—D of Fig. 3.

In the apparatus shown on the drawings, the food receptacle consists of closed ends 2 and apertured sides 3, mounted on a bottom plate having flanges 21, the apertures in the sides 3 being at a higher level than the bottom so as to provide a tray for the reception of the food and the apertures being adapted to be closed by means of wire netting guards 4 removably slidable in guides 5. The food receptacle is adapted to form a trough for animal food or water to which access may be had through the apertured sides 3 when the guards 4 are removed. The guards may be fitted in position at night or when the trap is set. The cover 1 is indicated by dotted lines on the drawing. The cover 1 is preferably portable and of inverted V-shape (as indicated in dotted line in Figs. 1 and 2) with vertical ends overlapping the ends 2 of the food receptacle. Instead of providing the portable cover 1, a flat cover or a wire netting guard may be provided over the top of the food receptacle.

Projecting centrally through each end 2 of the food receptacle is a rectangular tunnel 6, the sides of which may be flanged outward at the base at 7 and detachably fixed to the floor of the food receptacle. The floor 9 of each tunnel (as shown in Fig. 3) extends from the outer end to about one-third of its length. The inner end of the tunnel 6 is thus open below and registers with a corresponding opening 10 in the underlying floor of the food receptacle. The outer ends of the tunnels 6 may project somewhat outside the ends 2 of the food receptacle, in order to restrict the length of the latter.

The two tunnels 6 are preferably disposed in line with each other and their inner ends separated by a central food or bait trough 11 which may be formed by means of two shallow vertical partitions extending from side to side of the food receptacle and fitting against and across the lower part of the inner end of each tunnel.

The central bait trough 11 may be provided with a portable cover to prevent access to any special bait by birds or animals during the day when the food receptacle is open.

The spaces between the sides of the tunnels 6 and the sides 3 of the food receptacle also form food troughs.

Within each tunnel 6 and extending substantially the full length thereof is a pivoted chute 12 which is normally maintained horizontal and has preferably upturned sides 13 and a down-turned outer end 14 which rests upon the floor of the tunnel 6 and is "set in" slightly from the outer end of the tunnel so as to clear (when tilting) a run-board or the like which may be placed against the end of the tunnel. The sides 13 and down-turned end 14 may be in one with the floor of the chute 12 and thereby serve to stiffen the chute as well as to eliminate gaps or open joints which may excite suspicion.

The sides 13 of the chute are preferably slightly clear of the tunnel sides and are cut back at the inner end (as shown in Fig. 3) at an angle so as to clear a barrier 8 which extends across the inner end of the tunnel. The low barrier 8 serves to stiffen the tunnel and renders it more difficult for the rodent to jump into the trough 11 when near the end of the tilting chute. Moreover, should the rodent obtain access to the interior of the food receptacle and endeavour to escape through the tunnel, it must pass over the barrier on to the chute, thus increasing its pressure on the end of the chute and ensuring tilting of the latter.

The chute 12 is pivoted at about one third of its length from the outer end upon a horizontal spindle 15 supported in suitable bearings or apertures in the sides of the tunnel 6. The inner end 22 of the tunnel floor 9 may serve as a stop for limiting the tilt of the chute, as indicated in Fig. 3. Side or lateral play of the spindle 15 and chute 12 may be prevented by any suitable mechanical means.

The length and balance of the chute is so selected as to allow for the varying weights of rats and the like, that portion of the chute on the inner side of the spindle 15 being approximately twice the length of the outer portion. To ensure the chute returning from the limit of depression to the horizontal, the outer portion of the chute may be counter-weighted, for example, by means of a counterweight 17 bolted to the inner face of the down-turned end 14 of the chute.

Underneath the outer portion of the chute is fitted a steel magnet 16 adjustably secured to the floor of the tunnel 6 in such a position that the two poles of the magnet are in close contact with the underside of the chute or a soft iron or steel keeper or armature 17 attached thereto.

The magnet 16 ensures instant interruption of the equilibrium so that, when the rodent has passed over the spindle 15 to a point where its applied weight breaks contact between the magnet 16 and its keeper 17, the rodent is powerless to restore the balance of the tilting chute and is precipitated into a container below the food receptacle.

The chute may be secured in the normal position in any convenient manner, when the animal trap is not required, as by means of pins inserted through apertures 18 in the tunnel 6.

The container is shown in dotted lines in Fig. 2 and preferably comprises a tank-like receptacle 20 slightly longer and wider than the food receptacle, the latter being provided with a flanged rim 21 adapted to fit over the container 20 so that the food receptacle is retained in correct position above the container 20 and the joint between the two parts is covered so as to muffle the movements and scent of rats within the container. The container 20 may be sunk into the ground so that the food receptacle is disposed at ground level.

The container preferably contains water to a suitable depth upon which may be provided a layer of cork dust to minimize splash when the rodent is precipitated into the container and to accelerate drowning.

By making the container 20 slightly larger than the food receptacle, the latter may be stowed in inverted position inside the container 20 for transport purposes after the tunnels 6 have been removed and stowed within the container. The cover 1 may then be stowed on the upturned food receptacle and so protect the tunnel chutes 12.

The container 20 may consist of a hole in the ground suitably reinforced with sheet iron, cement, wire netting or the like and any number of containers may be used in conjunction with one food receptacle or animal trap, the latter being transported from container to container as required. This arrangement will obviate the frequent digging of holes for the reception of the container 20.

The improved apparatus hereinbefore described may also be used as an animal trap in factories, stores and other buildings in which case suitable run-boards may be provided for access to the tunnels where the container cannot be sunk into the ground or floor. Such access may, however, be provided by simply placing a box, or any handy implement against the end of each tunnel.

A perforated guard of inverted channel shape with an end door may be provided when the container is sunk below ground level, the guard being placed over the tray at night so that access can only be gained through the tunnel or by the end door when open.

The combined tunnel and chute may also be adapted for use as an animal trap in other ways, such as in runways through the walls of a room or enclosure frequented by rats, the tunnel being placed at a suitable height above the ground so that the animals are precipitated into the enclosure and cannot escape therefrom. Alternatively, when the tunnel is passed through the wall at ground level, a container may be sunk underneath the inner end and provided with a cover when not in use.

Although I have illustrated two tunnels projecting into the food receptacle, it is to be understood that one or any number of tunnels may be provided in conjunction with the food receptacle.

Claims—

1. The combination with a poultry or animal feeding trough of a pair of tunnels each projecting through opposite ends of the trough, each tunnel being open throughout its length and at its ends and having an opening in its floor, a pair of pivoted and counterbalanced chutes each normally closing one of said tunnel floor openings and adapted to project therethrough when overbalanced, a low barrier across the exit end of each tunnel and an open food chamber between the two barriers.

2. A combined animal trap and feeder as specified in claim 1 having a removable cover for the food receptacle, apertures in the sides of the receptacle and detachable guards for closing said apertures.

The foregoing specification signed at Edinburgh, Scotland, this third day of July, 1922.

ROBERT STEWART.